(12) United States Patent
Menon et al.

(10) Patent No.: US 6,868,325 B2
(45) Date of Patent: Mar. 15, 2005

(54) TRANSIENT FAULT DETECTION SYSTEM AND METHOD USING HIDDEN MARKOV MODELS

(75) Inventors: Sunil K. Menon, Golden Valley, MN (US); Emmanuel O. Nwadiogbu, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 40 days.

(21) Appl. No.: 10/384,182

(22) Filed: Mar. 7, 2003

(65) Prior Publication Data

US 2004/0176879 A1 Sep. 9, 2004

(51) Int. Cl.$^7$ ............................................. G06F 15/60
(52) U.S. Cl. .......................... 701/100; 701/29; 701/33; 701/34; 701/35; 702/182; 702/185; 703/2; 703/8
(58) Field of Search ............................. 701/29, 33, 34, 701/35, 100; 702/182, 185; 703/2, 8

(56) References Cited

U.S. PATENT DOCUMENTS

| | | | | |
|---|---|---|---|---|
| 4,215,412 A | * | 7/1980 | Bernier et al. | 701/100 |
| 5,070,458 A | * | 12/1991 | Gilmore et al. | 701/14 |
| 5,233,512 A | * | 8/1993 | Gutz et al. | 700/30 |
| 5,309,379 A | * | 5/1994 | Rawlings et al. | 703/8 |
| 5,465,321 A | * | 11/1995 | Smyth | 706/20 |
| 5,857,321 A | * | 1/1999 | Rajamani et al. | 60/39.27 |

OTHER PUBLICATIONS

Heck et al., "Mechanical System Monitoring Using Hidden Markov Models", IEEE 1991, p. 1697–1700.*
Ying et al., "A Hidden Markov Model–Based Algorithm for Fault Diagnosis with Partial and Imperfect Tests", IEEE Transactions on Systems, Man, and Cybernetics–Part C: Applications and Reviews, vol. 30, No. 4, Nov. 2000, p. 463–473.*
Whitney et al. "Multi–Scale Signal Feature Processing for Automatic, Objective Vehicle Noise and Vibration Quality Analysis", IEEE 1995, p. 2959–62.*

\* cited by examiner

*Primary Examiner*—Michael J. Zanelli
*Assistant Examiner*—Eric M. Gibson
(74) *Attorney, Agent, or Firm*—Robert Desmond, Esq.

(57) ABSTRACT

A transient fault detection system and method is provided that facilitates improved fault detection performance in transient conditions. The transient fault detection system provides the ability to detect symptoms of engine faults that occur in transient conditions. The transient fault detection system includes a Hidden Markov Model detector that receives sensor data during transient conditions and determines if a fault has occurred during the transient conditions. Detected faults can then be passed to a diagnostic, system where they can be passed as appropriate to maintenance personnel.

42 Claims, 11 Drawing Sheets

| HMM TRAINING DATA | GOOD START DATA | | | BAD START DATA | | |
|---|---|---|---|---|---|---|
| | ORIGINAL | 10% NOISE | 20% NOISE | ORIGINAL | 10% NOISE | 20% NOISE |
| BOOTSTRAP (SPEED) | 0.1983 | 0.2117 | 0.2251 | 0.0599 | 0.0558 | 0.0536 |
| NOISY DATA (SPEED) | 0.1431 | 0.1455 | 0.1432 | 0.1032 | 0.1036 | 0.1106 |
| BOOTSTRAP (SPEED AND EGT) | 0.0455 | 0.0468 | 0.0480 | 0.2616 | 0.2605 | 0.2613 |
| NOISY DATA (SPEED AND EGT) | 0.0667 | 0.0647 | 0.0645 | 0.2016 | 0.2064 | 0.2080 |

TRANSIENT FAULT DETECTION SYSTEM AND METHOD USING HIDDEN MARKOV MODELS

FIELD OF THE INVENTION

This invention generally relates to diagnostic systems, and more specifically relates to fault detection during transient conditions.

BACKGROUND OF THE INVENTION

Modem aircraft are increasingly complex. The complexities of these aircraft have led to an increasing need for automated fault detection systems. These fault detection systems are designed to monitor the various systems of the aircraft in an effect to detect potential faults. These systems are designed to detect these potential faults such that the potential faults can be addressed before the potential faults lead to serious system failure and possible in-flight shutdowns, take-off aborts, and delays or cancellations.

Engines are, of course, a particularly critical part of the aircraft. As such, fault detection for aircraft engines are an important part of an aircrafts fault detection system. Traditional engine fault detection has been limited to methods that are based on engine data collected at steady-state conditions. While these methods have been effective in detecting faults that exhibit symptoms during steady-state operation, they have been unable to effectively detect faults for which no symptoms arise during steady state conditions. For example, these methods are unable to effectively detect faults where the feedback control action in steady state suppresses the effect of sensor and system faults. Other faults may simply not manifest symptoms during steady state operation. Thus in all these case current fault detection systems are unable to consistently detect all potential faults that can effect the operation of the engine. This is particularly true for incipient faults that often are manifest only in engine startup characteristics.

Thus, what is needed is an improved system and method for detecting engine faults that occur in transient conditions, such as during engine startup.

BRIEF SUMMARY OF THE INVENTION

The present invention provides a transient fault detection system and method that provides improved performance. The transient fault detection system provides the ability to detect symptoms of engine faults that occur in transient conditions. The transient fault detection system includes a Hidden Markov-Model detector that receives sensor data during transient conditions and determines if a fault has occurred during the transient conditions. Detected faults can then be passed to a diagnostic, system where they can be passed as appropriate to maintenance personnel.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and:

FIG. 10 is a table illustrating exemplary results of a Hidden Markov Model detector.

DETAILED DESCRIPTION OF THE INVENTION

The present invention provides a transient fault detection system and method that provides improved performance. The transient fault detection system provides the ability to detect symptoms of engine faults that occur in transient conditions. The transient fault detection system includes a Hidden Markov Model detector that receives sensor data during transient conditions and determines if a fault has occurred during the transient conditions. Detected faults can then be passed to a diagnostic system, where they can be passed as appropriate to maintenance personnel.

Figure 1:
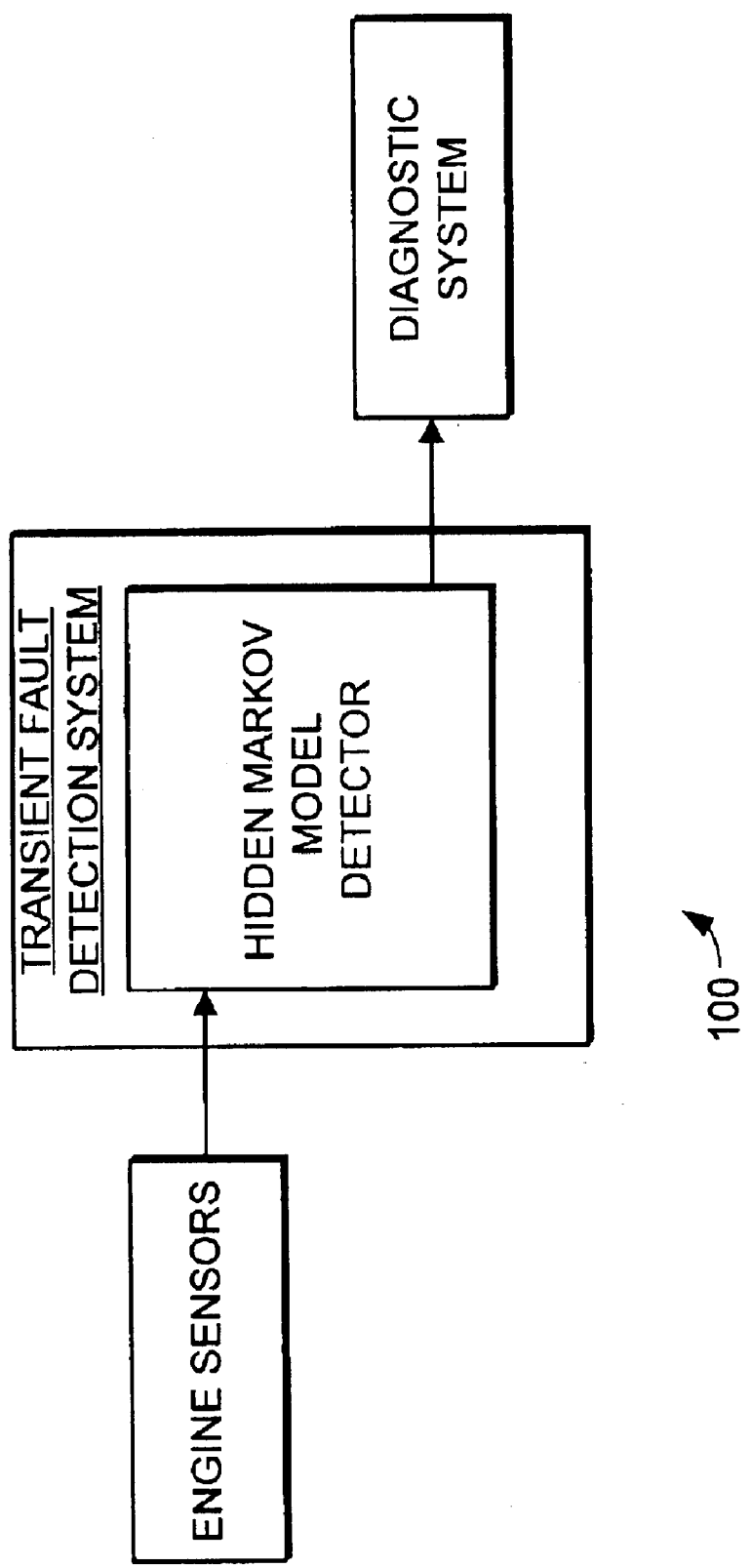
FIG. 1 is a schematic view of a transient fault detection system.

Turning now to FIG. 1, a transient fault detection system 100 for engine systems is illustrated. The transient fault detection system 100 includes a Hidden Markov Model detector. Turbine engine sensor data is measured during the transient conditions. The turbine engine sensor data is then passed to the Hidden Markov Model detector. The Hidden Markov Model detector examines the engine sensor data for indications of problems occurring in the engine during the transient conditions. The results of the detection process are then passed to a diagnostic system, where they can be relayed to a user, or subject to further analysis.

The transient fault detection system and method is particularly applicable to the detection of transient faults that occur during startup. In this application, the transient fault detection system monitors turbine engine sensor data during the engine startup. The turbine engine sensor data from the engine startup is passed to the Hidden Markov Model detector. The Hidden Markov Model detector analyzes the turbine engine sensor data and determines if a fault has occurred during startup. Thus, the transient fault detection system provides for improved fault detection for turbine engine startup. Of course, the transient fault detection system can be used in other transient conditions, including during changes in operating mode such as when the engine goes from startup to ground idle, and during changes in power setting, such as during acceleration or deceleration of the engine.

In general, Hidden Markov Models (HMMs) are stochastic signal models that use definable parameters to model complex behaviors. Hidden Markov Models uses a number of internal states and a defined state sequence described by state transition probabilities to model complex behaviors. The states include a number of outputs that are distinct from the internal states. These outputs, called model outputs can be a scalar value, representing a single input type to the Hidden Markov Model, or a vector quantity representing multiple input types. The model outputs are used to generate a probability that is a measure of how well the Hidden Markov Model matches the measured data.

In the transient fault detection system, the Hidden Markov Model detector is used to model the turbine engine behavior in transient conditions. To accomplish this, a Hidden Markov Model is configured to represent the engine behavior during transient conditions. Specifically, the Hidden Markov Model is configured to represent the engine sensor data that is generated by the turbine engine during startup. The configuration of the Hidden Markov Model includes selecting type of Hidden Markov Model used, and the number of states and the number of model outputs in the Hidden Markov Model. Sample or training data sets representing the turbine engine behavior are then used to train the Hidden Markov Model. Stated another way, training data sets are used to determine the internal parameters of the Hidden Markov Model. These internal parameters include the transition probabilities that determine state transitions in the Hidden Markov Model.

When configured and trained, the Hidden Markov Model can receive engine sensor data and generate an output of probabilities that represent how close the engine sensor data is to the training data sets used to train the Hidden Markov Model. These probabilities can be in the form of a log-likelihood value (LLV) that is representative of how close the engine behavior is to the behavior that created the training data sets.

The Hidden Markov Model detector can be trained using various types of training data sets and the type used will determine how the Hidden Markov Model detector works. For example, the Hidden Markov Model detector can be trained with nominal data sets that describe the "normal" operation of the engine during transient conditions, when no faults are present. When trained with such nominal data sets, the Hidden Markov Model detector can then be used to determine how close engine operation is to this normal operation. Thus, in this embodiment, the Hidden Markov Model detector generates a log-likelihood value that is representative of how close the current transient operation is to the normal operation. When the log-likelihood value indicates that the engine is not operating normally, the presence of a potential fault has been detected.

Conversely, the Hidden Markov Model detector could be trained with data sets that describe "abnormal" or "defective" operation of the turbine engine. When trained with such data sets, the Hidden Markov Model detector can then be used to determine how close engine operation is to the "abnormal" conditions represented by the training data sets. Thus, in this embodiment the Hidden Markov Model detector generates a log likelihood value that is representative of how close the current transient operation is to the type of abnormal operation that was used to train the detector. When the log-likelihood value indicates that the engine is operating in an abnormal way, the presence of a potential fault has been detected.

As a further variation, the transient fault detection system can include multiple Hidden Markov Model detectors. In this variation, the multiple detectors can be trained with different data sets. For example, one detector can be trained with nominal sensor data and used to detect "normal operations" Other detectors can be trained with various abnormal data sets representative of different types of transient engine faults. These detectors can then be used to specifically detect these different types of abnormal operations. Thus configured, the transient fault detection system can provide robust detection of faults, and the ability to identify some specific types of faults.

The transient fault detection system and method can use a variety of different types of sensor data to detect turbine engine transient faults. For example, the system can use engine speed or exhaust gas temperature (EGT) data sets, or a combination of both. Other potential data sets that are related to engine operation and may be used by the Hidden Markov Model detector include compressor pressure and fuel flow.

The Hidden Markov Model detector can be implemented using a variety of model types, structures and parameters. One suitable type of implementation is a left-right Hidden Markov Model, sometimes referred to as a Bakis model. A left-right Hidden Markov Model is one in which the number of states is equal to the number of the outputs. A left-right Hidden Markov Model is particularly suited for use to model turbine engine transient since the left-right Hidden Markov Model has a property that as time increases, the state index remains the same or increases. The states therefore proceed from left to right. The left-right Hidden Markov Model is especially suited to model signals whose properties change with time. Of course, other types of Hidden Markov Models can be used, such as the ergodic model and the left-right parallel path model.

In addition to selecting the type of Hidden Markov Model used in the detector, the number of internal states should be selected to accurately represent the transient conditions that are being modeled. One potential implementation is to have the number of internal states used in the Hidden Markov Model equal to the number of sensor measurements taken during the transient condition that is being monitored. For example, if the engine sensors take 20 different sensor measurements during a turbine engine startup, the Hidden Markov Model used to represent this condition can be implemented with 20 internal states. In another implementation, the number of internal states is selected to be smaller than the number of sensor measurements.

Similarly, the number of outputs in the Hidden Markov Model can be selected to accurately represent he transient conditions that are being modeled. As stated above, one implementation is to use a left-right Hidden Markov Model that has the same number of outputs and states. In this implementation, the number of states and number of outputs could both be equal to the number of sensor measurements taken during the transient condition that is being monitored. In addition, these model outputs can be of various types, including both scalar and vector values.

As an example, in a case where the Hidden Markov Model receives on single sensor data type as an input (e.g., either engine speed or EGT), each model output can be a scalar value. In another example, where Hidden Markov Model receives multiple sensor data types as inputs (e.g., both engine speed and EGT), each model output can be vector quantity representing these different types together.

Thus, the type structure and internal parameters of the Hidden Markov Model detector can be selected to accurately model transient conditions for a particular application. With the parameters selected, the Hidden Markov Model can be trained using a variety of procedures and test data sets. As stated above, the Hidden Markov Model can be trained with either "normal" or "abnormal" test data sets, with the normal test data sets representative of good transient operations and the abnormal test data sets representative of faulty transient operations. The test data sets can be generated in a variety of ways. As one example, the test data sets are generated in a test bed environment, where a turbine engine is put through a variety of transient conditions and sensor data is recorded to generate sensor data sets indicative of good and bad transient behaviors. Likewise, advanced modeling techniques can be used to generate such sensor data.

This generated sensor data can then be further enhanced for use in training the Hidden Markov Model. In a first method, a multiplicative normal noise term is added to the original data and additional data points are thus generated. In a second method, a variation of the bootstrap method is applied to the data at each time instant. In this way, additional data sets for Hidden Markov Model training are obtained.

The training data sets are used to train Hidden Markov Model detector. Training determines the Hidden Markov Model parameters. One suitable training algorithm is the Baum-Welch algorithm. Other suitable training methods include gradient methods and the Expectation-Modification (EM) method. When thus trained with the appropriate training data, the Hidden Markov Model parameters then represent the normal or abnormal operation of the turbine engine.

During operation, sensor data from the turbine engines is provided to the transient fault detection system. The Hidden Markov Model detector receives the sensor data, and calculates the probability that the sensor data came from transient operation equivalent to the trained Hidden Markov Model. Thus, if the Hidden Markov Model detector was trained with normal sensor data, the Hidden Markov Model detector calculates the probability that the engine was operating normally in the transient condition. Conversely, if the Hidden Markov Model detector was trained with abnormal sensor data, the Hidden Markov Model detector calculates the probability that there is a fault in the transient operation of the turbine engine. This probability is provided in the form of a log-likelihood value. Because sensor data from a faulty startup would yield a log-likelihood value that is very different from that generated by good startup data, the log-likelihood value can be used as a fault indicator for the turbine engine.

Figure 2:
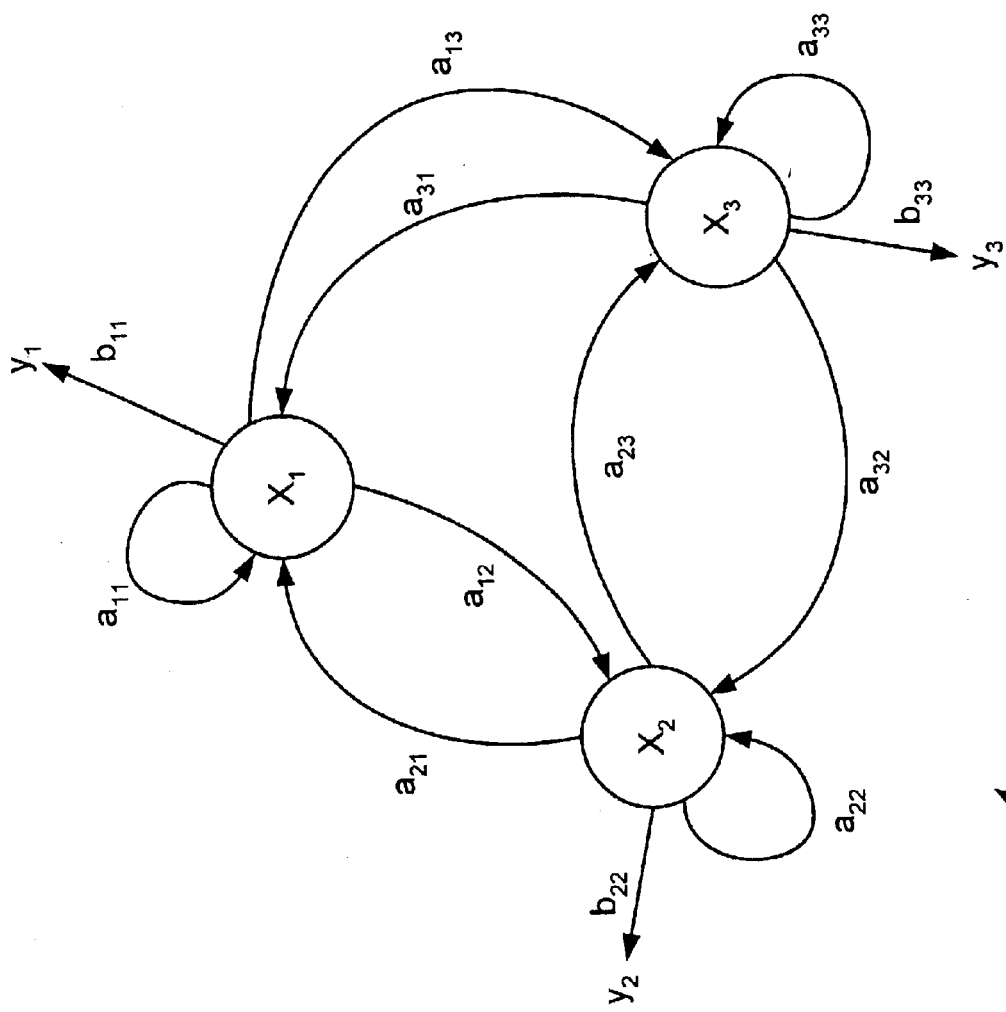
FIG. 2 is a schematic view of an exemplary Hidden Markov Model.

Turning now to FIG. 2, an exemplary Hidden Markov Model 200 is illustrated. The Hidden Markov Model 200 is a simplified example of the type of model that can be used to implement a Hidden Markov Model detector. The exemplary Hidden Markov Model 200 includes three exemplary states, $x_1$, $x_2$ and $x_3$. It should be noted that in a typical implementation, a Hidden Markov Model detector would include many more states to more accurately model the transient engine behavior.

In model 200, a sequence of states at successive times, up to a time T, is $x^T = \{x(1), x(2), \ldots, x(t), \ldots, x(T)\}$, where $x(t)$ is the state at time t. The state sequence of the model 200 is described by state transition probabilities $a_{ij}$, where $a_{ij}$ is defined as:

$$a_{ij} = P(x_j(t+1)|x_i(t)), \quad 1 \leq i, j \leq N, \qquad \text{Equation 1.}$$

where, $a_{ij}$ is the time independent probability of having state $x_j$ at time (t+1) given that the state at time t was $x_i$ and N is the number of distinct system states. To calculate the probability that a particular model, specified by the state transition probabilities $a_{ij}$, generated a particular state sequence, the successive probabilities are multiplied. In Hidden Markov Models, the states are not available, hence the "hidden" in the name, so the model external measurements y are distinct from the hidden states. There is a probability, $b_{jk}$, associated with a particular output being emitted by a particular stated defined by:

$$b_{jk} = P(y_k(t)|x_j(t)), \quad 1 \leq j \leq N, 1 \leq k \leq M, \qquad \text{Equation 2.}$$

where M is the total number of measurable outputs.

In developing a Hidden Markov Model, three significant issues arise. First, given an Hidden Markov Model with transition probabilities, $a_{ij}$ and $b_{jk}$, defined, determine the probability that a particular set of observations, y(t), was generated by this model. Second, given a Hidden Markov Model as well as a set of measurements, y(t), determine the most likely sequence of hidden states, x(t), that led to these observations. Third, given a set of training observations and the approximate structure of the Hidden Markov Model, the number of hidden states, and the number of observations, determine the probabilities $a_{ij}$ and $b_{jk}$.

The probability of a particular observation sequence given a specified Hidden Markov Model, is represented by:

$$P(Y^T) = \sum_{s=1}^{s_{max}} P(Y^T | x_s^T) P(x_s^T), \qquad \text{Equation 3.}$$

Where s is the index of the state sequence $x_s^t$ of T hidden states. Since the output probabilities depend only on the hidden states, which is assumed here, the first term in equation 3 can be written as:

$$P(Y^T | x_s^T) = \prod_{t=1}^{T} P(y(t) | x(t)), \qquad \text{Equation 4.}$$

This is essentially a product of the output transition probabilities $b_{jk}$. Also, since we can assume that the state dynamics are described by a first-order Markov process, the second term in equation 3 can be described as:

$$P(x_s^T) = \prod_{t=1}^{T} P(x(t) | x(t-1)), \qquad \text{Equation 5.}$$

This is essentially a product of the state transition probabilities, $a_{ij}$. Thus, the first problem discussed above is solved using a forward propagation mathematical procedure. The solution to the third problem, to determine the HMM parameters, is analogous to the problem of determining the weights of a neural network given the training data sets and network model structure. As one example, this can be accomplished using a Baum-Welch or forward-backward procedure. This is a specific instance of the Expectation-Maximization method. Such a method is described in greater detail at "A Tutorial on Hidden Markov Models and Selected Applications in Speech Recognition" by L. R. Rabiner, *Proceedings of the IEEE*, 77, No. 2, 1989, which is hereby incorporated by reference.

The log-likelihood value of the Hidden Markov Model detector is a measure of how well the HMM matches the measured data. It can be calculated as:

$$L = \log(P(Y^T)), \qquad \text{Equation 6.}$$

Where P(Y) is the probability of the observation sequence given the Hidden Markov Model detector parameters defined by equation 3.

It should be noted that while the above example describes the HMM with the assumption that the output y(t) is a discrete variable, that in many applications, the output y(t) would be a continuous variable. Such a continuous variable can be modeled by assuming that the output as a Gaussian or Gaussian mixture distribution.

Figure 3:
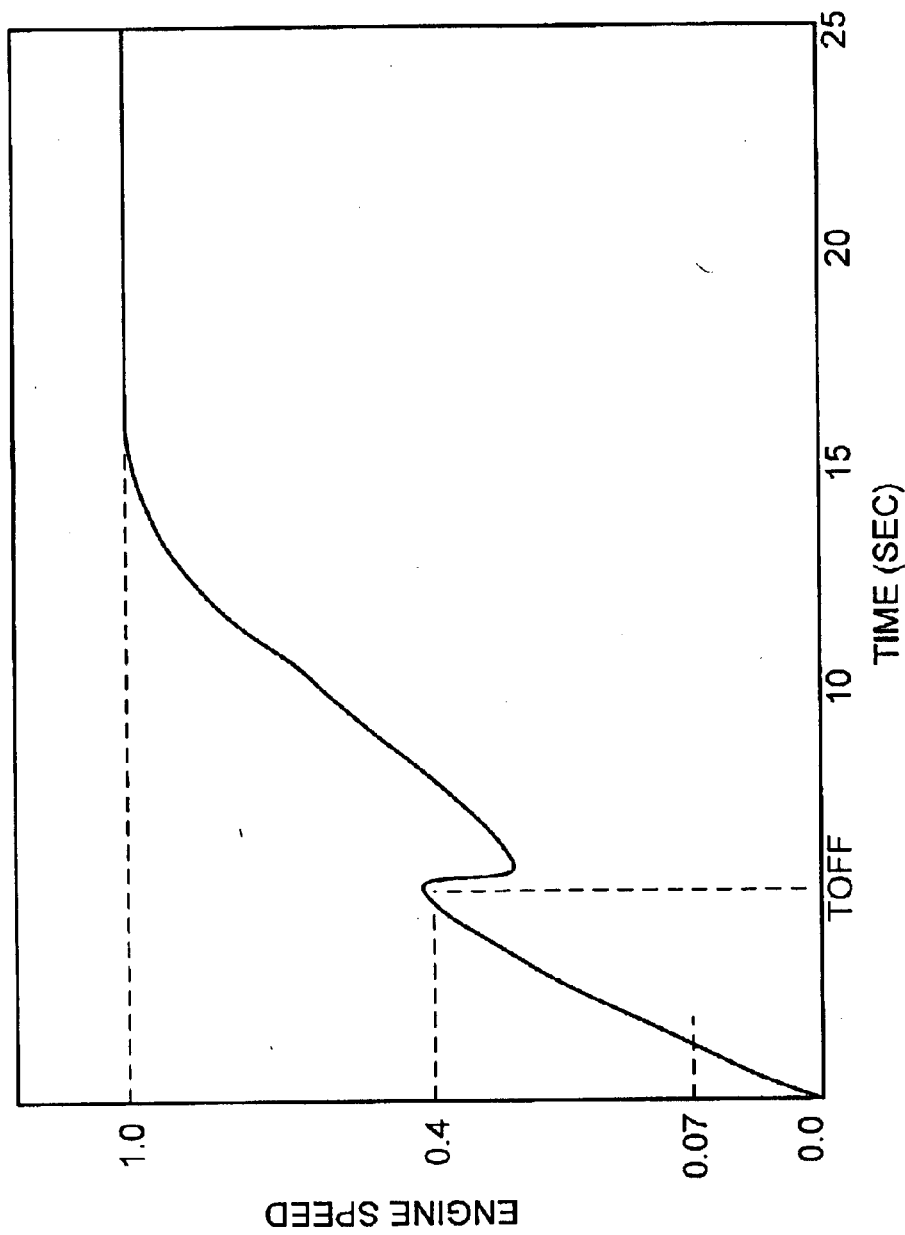
FIG. 3 is an exemplary plot of turbine engine speed during engine startup.

The transient fault detection system can be used to detect faults that occur in a wide variety of transient conditions. One area of particular applicability is in turbine engine startup. Other areas of applicability include any time the engine changes speed, such as during engine traverse from ground idle to max speed and from flight idle to cruise. Turning now to FIG. 3, a typical turbine engine speed plot during engine startup is illustrated. FIG. 3 illustrates engine speed (as a percentage of full engine speed) as a function of time from startup. The startup sequence proceeds as follows: The starter begins to rotate the engine and the igniter is switched on, causing the igniter plugs to start firing. At about 7% (0.07) of full engine speed the igniter system is turned on. As the ignition system successfully completes light-off, the combustor is able to sustain combustion. The exhaust gas temperature (EGT) rises sharply at light-off. This rapid increase in EGT provides the indications that light-off has occurred. The engine starter continues to provide rotational torque to the engine as the engine speed continues to increase. The power section then begins to provide rotational energy to the system. At about 40% engine speed, the starter system is shut off (time TOFF in FIG. 2). There is a momentary drop in engine speed, as seen in FIG. 3, due to the drop in rotational torque-when the starter is shut off. The engine power section has then completely taken over responsibility for bringing the engine to full speed (or the required speed set point).

There are several problems that can arise during startup. For example, during the first phase of startup, until light-off has occurred, igniter system degradation can negatively impact startup and will manifest more strongly than at other times. Between 7% and 40% speed, starter faults are manifest more strongly than at other times of the startup. In the final phase, from the time the starter shuts off and the engine rotates on its own power, the effects of power section degradation are most evident. The effects of starter degradation propagate (in terms of start times) forward in time during the start cycle, but the engine power section effects dominate after the 40% speed mark (after the starter has been turned off).

Turning now to FIGS. 4–10, a detailed example of a transient fault detection system used for startup fault detection in a turbine engine will now be discussed. In the example of FIGS. 4–10 the transient fault detection system is used to detect problems in turbine engine during startup. In this example, sensor data used by the transient fault detection system includes engine speed data and/or exhaust gas temperature (EGT) data taken during engine startup. Of course, EGT and engine speed data are just two examples of the type of engine sensor data that can be used in the transient fault detection system.

Figure 4:
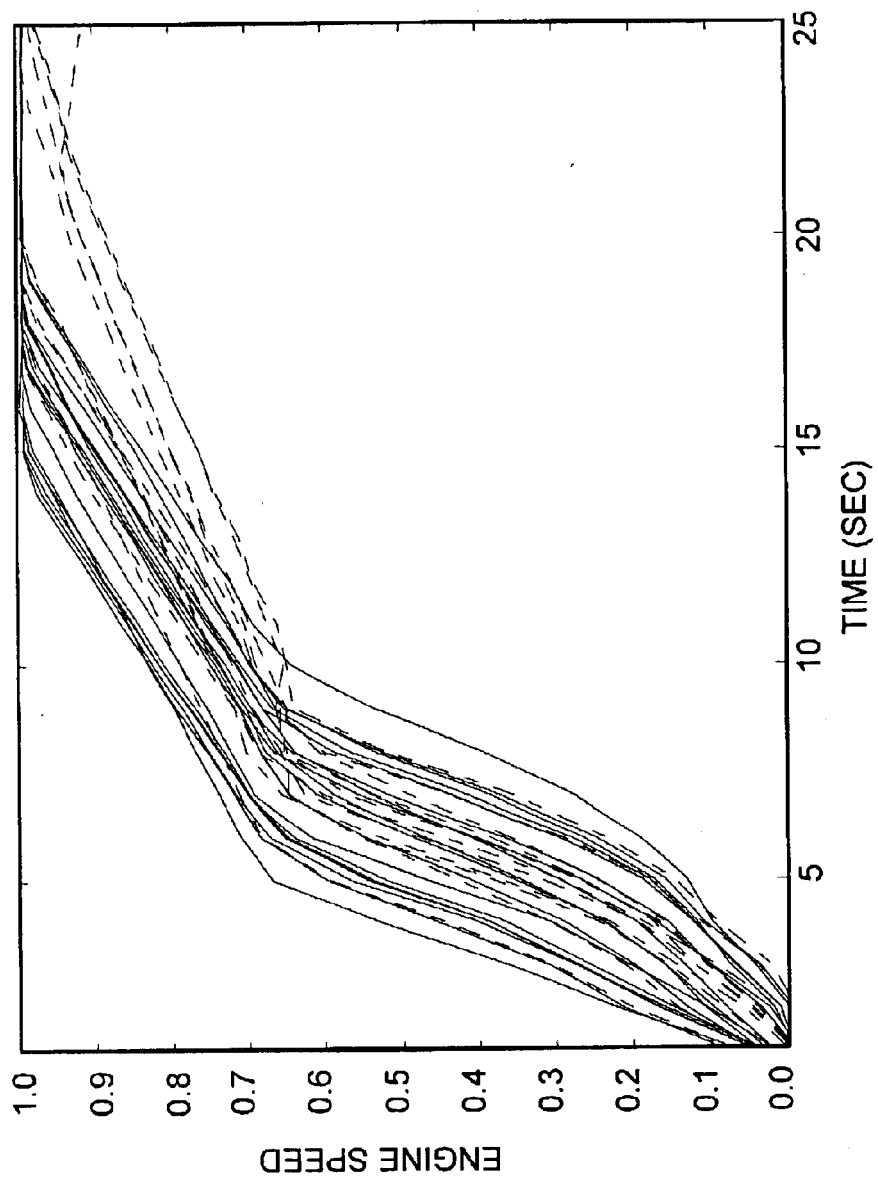
FIG. 4 is an plot of engine speed during 29 exemplary engine startups.
Figure 5:
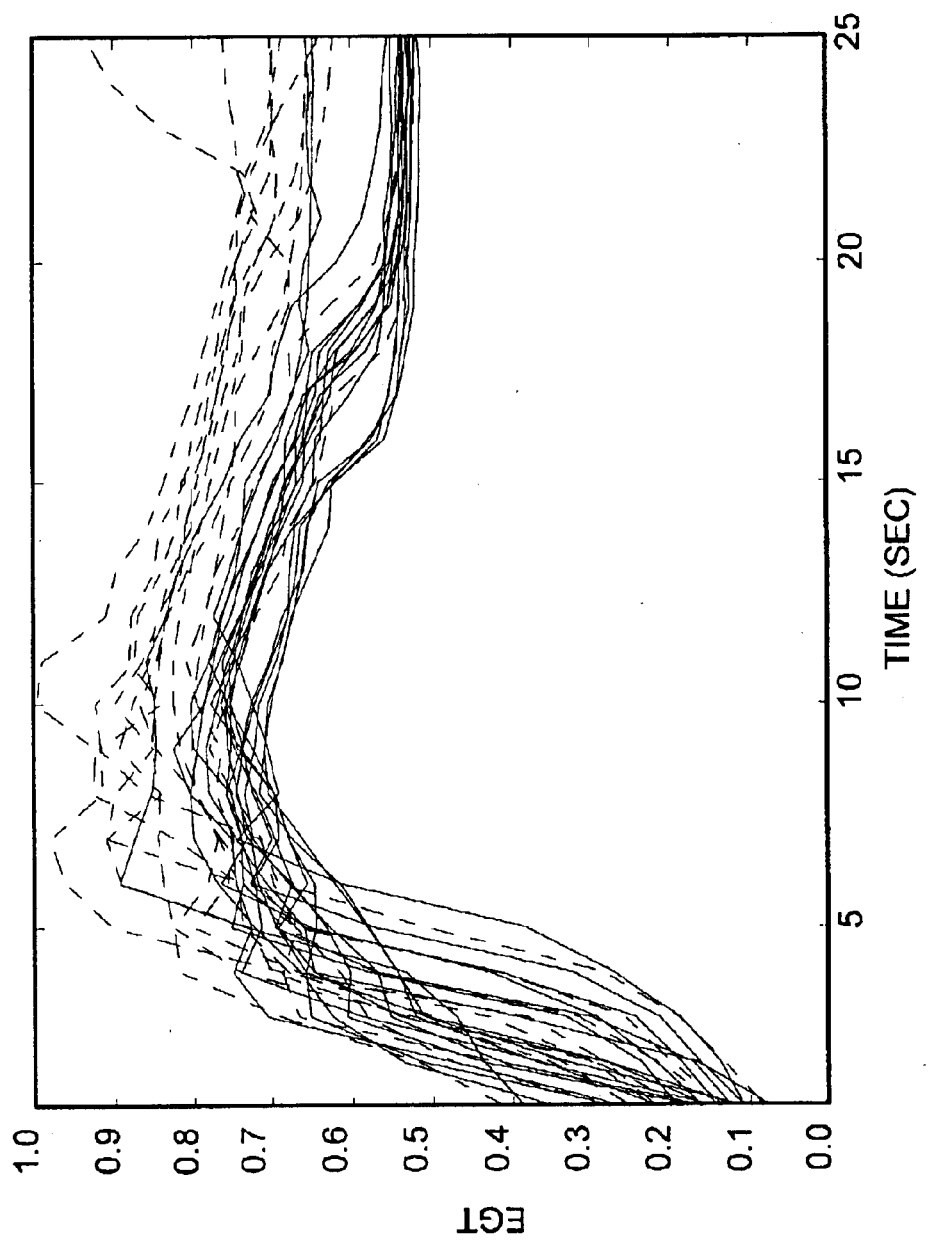
FIG. 5 is a plot of EGT during 29 exemplary engine startups.

Turning now to FIGS. 4 and 5, exemplary EGT and engine speed sensor data is illustrated. The exemplary sensor data shows the type of data that can be used in the transient fault detection system. Specifically, the data can be used to train and test the transient fault detection system, with the result being a transient fault detection system that can accurately determine when startup faults are occurring.

The exemplary EGT and engine speed data illustrated in FIGS. 4 and 5 result from engine sensor data being recorded from startup to full operating speed, at a rate of one sample per second. In FIGS. 4 and 5, the sensor data from 29 starts are illustrated. Included in this data are eighteen "good" starts and 11 "bad" starts, with the good starts illustrated with a sold line, and the bad starts illustrated with a dotted line. It should be noted that these starts are known to be "good" or "bad" because of additional data that is available in the testing environment. This additional data can include things such as compressed air pressures, both at the source and after valve modulations. For example, the starts in which systems functioned normally are classified as the "good" starts. In other starts, the air pressure modulating valve, a component in the engine start system, had mechanical failures, and these are the starts that are classified as "bad". It should also be noted that the additional data available in the testing environment that may not be available when the engine is installed and in use on the aircraft. Instead, these known good and bad starts are used to train and test the transient fault detection system, resulting in a system that can accurately detect faults based on the EGT and/or speed sensor data, and without the additional data that is only available in a testing environment.

It should also be noted that these 29 exemplary starts do not include any starts where the start valve failures were so advanced that the engine failed to start at all—so called "hung" starts. Instead, the bad starts are those starts that resulted in failures that were not yet advanced enough to cause a hung start, but are at a beginning to intermediate stage.

FIGS. 4 and 5 illustrate that many of the bad start profiles are similar to the good start profiles. This indicates that many of the startup failures are subtle and therefore difficult to detect and diagnose. As will become clear, by using suitable Hidden Markov Model detector, these starts can be consistently classified based on EGT and speed data even though the bad start profiles are similar to the good start profiles.

In the detailed example, the engine speed and/or EGT data are first used to train the Hidden Markov Model detector. Training teaches the Hidden Markov Model detector how to classify a start based on the feature extracted speed and EGT data. Thus, a properly trained Hidden Markov Model detector can be used to evaluate the performance of an engine start based on speed and EGT data even though the good and bad start profiles are substantially similar, as illustrated in FIGS. 4 and 5. A properly trained Hidden Markov Model detector can thus consistently determine whether a good start or a bad start has occurred.

Turning now to FIGS. 6–9, the performance of an exemplary Hidden Markov Model detector is illustrated with several examples. In these figures, a circle represents a good start, and a cross represents a bad start. Included in these examples are cases developed using only engine speed as sensor data, and cases using both engine speed and EGT. Additionally, the results of two different training data sets are illustrated in FIGS. 6–9. The first training data set was obtained by adding normal noise to the original set of startup data, and the second set is based on a variation of the bootstrap method of resampling data. The bootstrap method, as used here, is applied to the data set at each particular time instant. To generate these FIGS, the Hidden Markov Model detector was tested on test data sets developed with normal noise added to the original data set. The levels of noise are zero mean, 10% and 20% (of the original signal value) variance.

Figure 6:
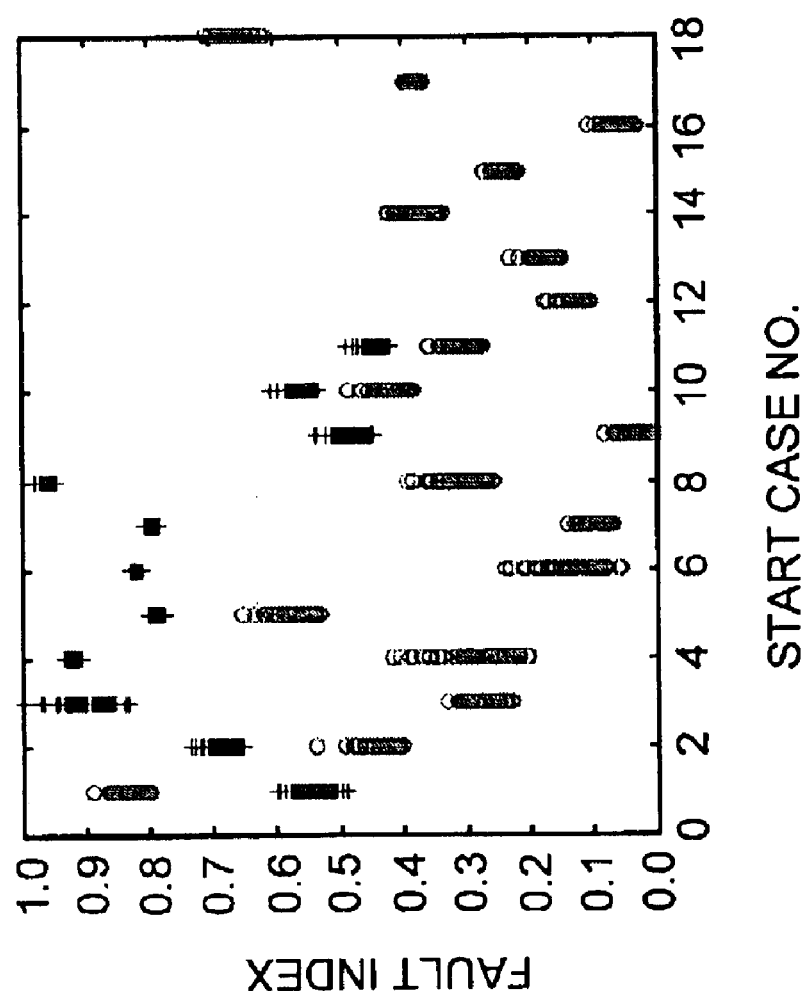
FIGS. 6–9 are plots illustrating the results of an exemplary Hidden Markov Model detector.
Figure 7:
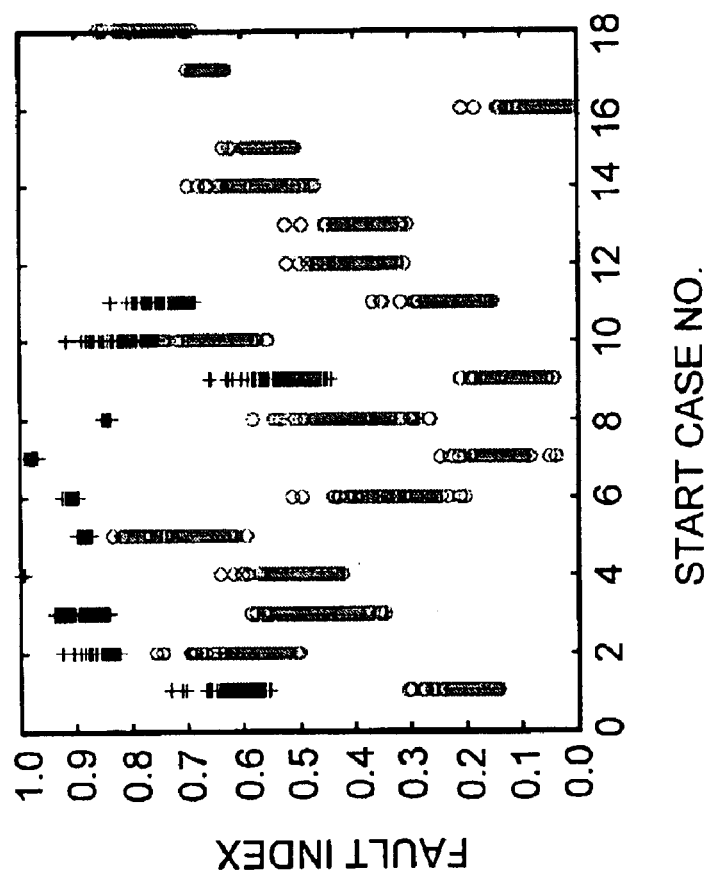
Figure 8:
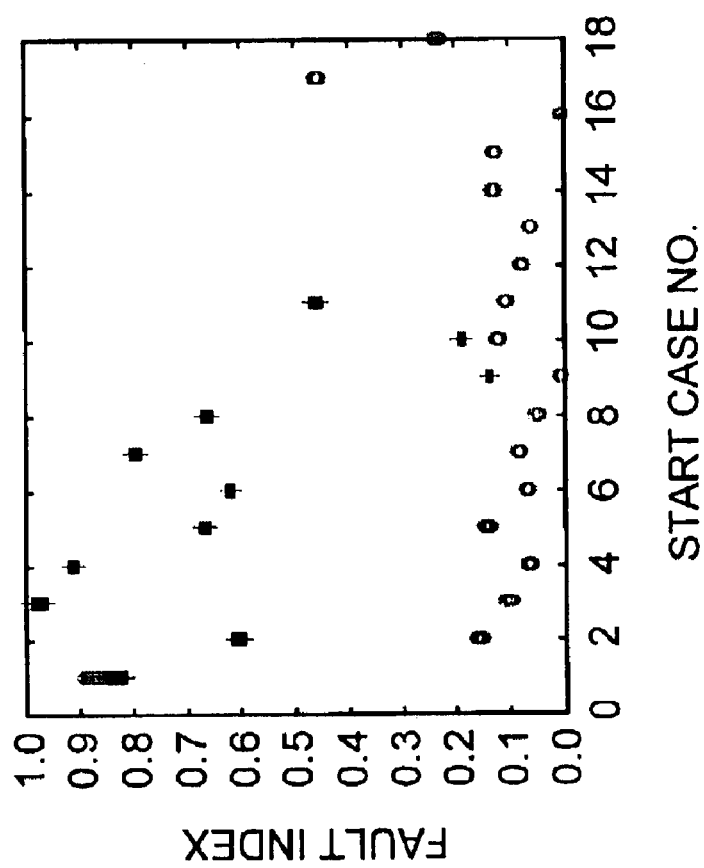

Specifically, FIG. 6 illustrates the exemplary outputs of a Hidden Markov Model that uses engine speed data and the test data with 20% noise, where the training data is the noisy data set. The "fault index" in FIG. 6 is the normalized log-likelihood value, with "0" indicating a no-fault condition and "1" indicating a fault condition. Likewise, FIG. 7 illustrates the outputs of a Hidden Markov Model detector that uses engine speed data, with the Hidden Markov Model detector trained on the bootstrap training set and the data set with 20% noise. FIG. 8 shows the outputs of a Hidden Markov Model detector that uses both engine speed and EGT data, and was trained on a noisy data set, on test data with 20% noise. Finally, FIG. 9 shows the outputs of a Hidden Markov Model detector that uses both engine speed and EGT data, and was trained on the bootstrap data set, on the test data set with 20% noise.

Figure 9:
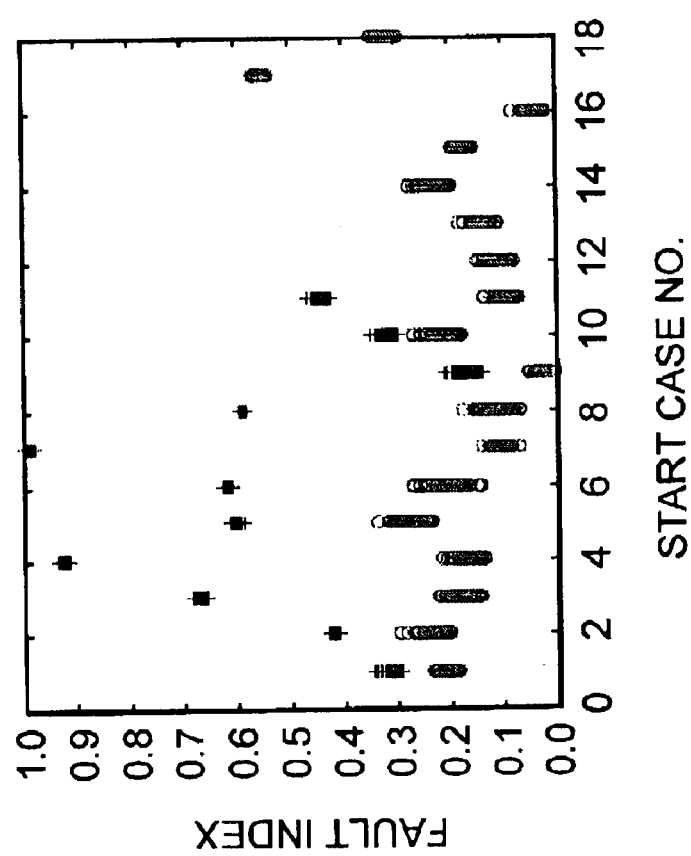

Turning now to FIG. 10, a table 1000 is illustrated that lists the mean square errors (MSEs) of the Hidden Markov Model detector outputs illustrated in FIGS. 6–9. The MSEs quantify the performance of the Hidden Markov Model detector methods and are a measure of the deviation of the outputs from their target values. In the case of good starts, the target output of the Hidden Markov Model detector is 0. In the case of bad starts, the target output of the Hidden Markov Model detector is 1. Table 1000 shows the effect of using the bootstrap training data is more pronounced when just the engine speed is modeled. Additionally, the Hidden Markov Model detector with the engine speed and EGT together achieved a very good performance on the good data but had lesser performance on the bad data. On possible reason may be that the EGT for the bad startup data is fairly close to the good startup data. FIGS. 8 and 9 show that although the performance of the Hidden Markov Model detector is good for most of the bad startup data, its performance on several of the bad startup cases is not as good. As a result, the overall MSE in the speed and EGT test cases is high.

Figure 11:
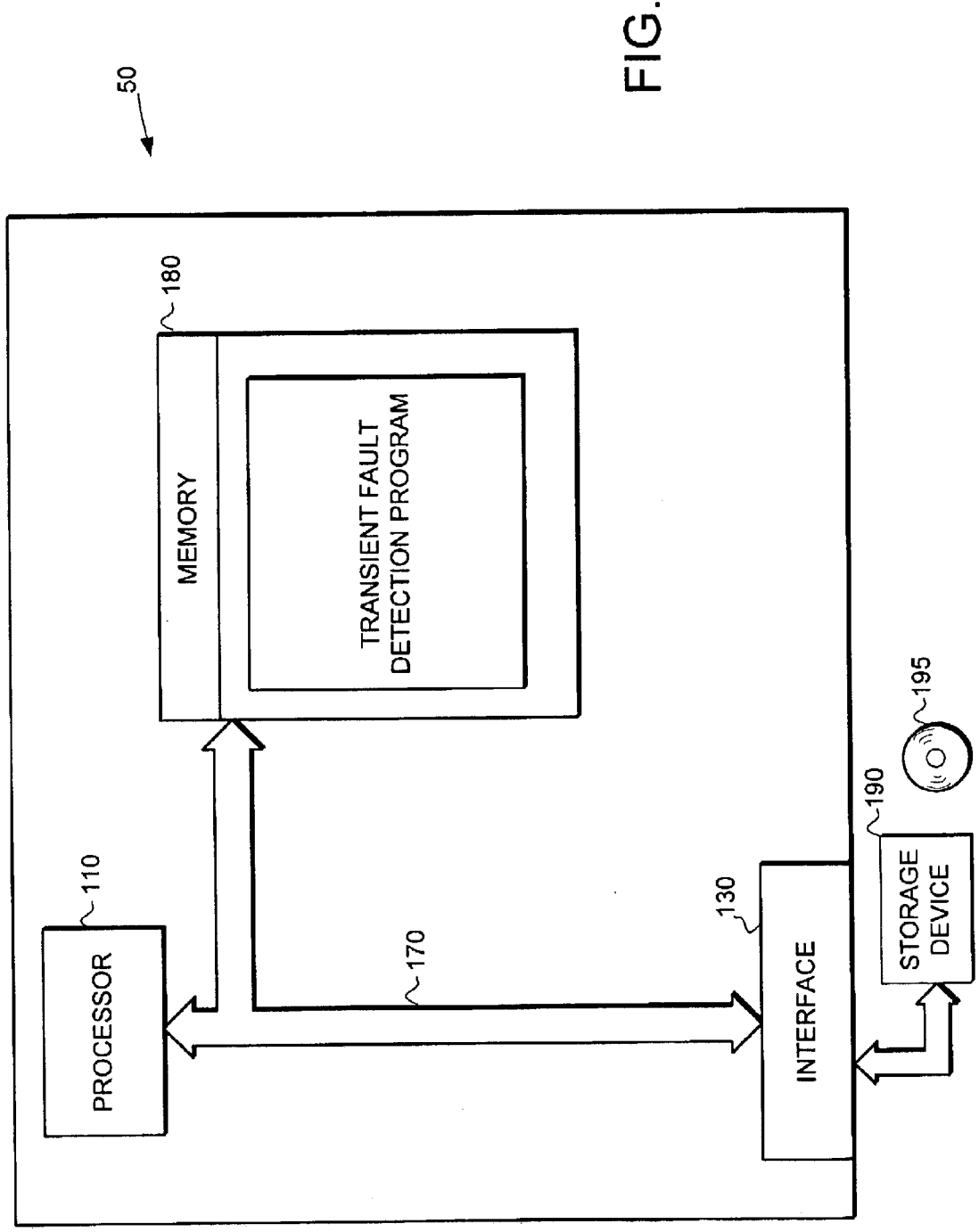
FIG. 11 is a schematic view of a computer system that includes a transient fault detection program.

The transient fault detection system and method can be implemented in wide variety of platforms. Turning now to FIG. 11, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes a transient fault detection program.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 11, storage device 190 can comprise a disc drive device that uses discs 195 to store data.

In accordance with the preferred embodiments of the invention, the computer system 50 includes the transient fault detection program. Specifically during operation, the transient fault detection program is stored in memory 180 and executed by processor 110. When being executed by the processor 110, the transient fault detection system monitors vehicle operation parameters to identify potential transient faults.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

The present invention thus provides a transient fault detection system and method that provides improved performance. The transient fault detection system provides the ability to detect symptoms of engine faults that occur in transient conditions. The transient fault detection system includes Hidden Markov Model detector that receives sensor data during transient conditions determines if a fault has occurred during the transient conditions. Detected faults can then be passed to a diagnostic system where they can be passed as appropriate to maintenance personnel.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A transient fault detection system for detecting transient faults in a turbine engine, the transient fault detection system comprising:
a Hidden Markov Model detector, the Hidden Markov Model receiving turbine sensor data from the turbine engine during a transient condition and analyzing the sensor data to determine a likelihood that a fault occurred during the transient condition, and wherein the Hidden Markov Model includes a plurality of states, each of the plurality of states corresponding to a sample in the turbine sensor data taken at a corresponding time during the transient condition.

2. The system of claim 1 wherein the Hidden Markov Model detector comprises a left-right Hidden Markov Model.

3. The system of claim 1 wherein plurality of states is equal in number to a number of samples in the turbine sensor data during the transient condition.

4. The system of claim 1 wherein the Hidden Markov Model is trained using a test data set, and wherein the test data set includes data from a normal transient condition, such that the Hidden Markov Model detector compares the turbine sensor data to the normal transient condition represented by the test data set.

5. The system of claim 1 wherein the Hidden Markov Model is trained using a test data set, and wherein the test data set includes data from an abnormal transient condition, such that the Hidden Markov Model detector compares the turbine sensor data to the abnormal transient condition represented by the test data set.

6. The system of claim 1 wherein the sensor data comprises engine speed.

7. The system of claim 1 wherein the sensor data comprises exhaust gas temperature.

8. The system of claim 1 wherein the transient condition comprises turbine engine startup.

9. The system of claim 1 wherein the transient condition comprises a change in engine power setting or engine operating mode.

10. The system of claim 1 wherein each of the plurality of states includes a model output, and wherein the number of states and the number of model outputs is equal in number to a number of samples in the turbine sensor data during the transient condition, and wherein the turbine sensor data includes both engine speed data and exhaust gas temperature data, and wherein the Hidden Markov Model detector compares the turbine sensor data from the transient condition to a sample transient condition represented by a test data set used to train the Hidden Markov Model detector.

11. An apparatus comprising:
 a) a processor;
 b) a memory coupled to the processor;
 c) a transient fault detection program residing in the memory and being executed by the processor, the transient fault detection program including:
  a Hidden Markov Model detector, the Hidden Markov Model receiving turbine sensor data from the turbine engine during a transient condition and analyzing the sensor data to determine a likelihood that a fault occurred during the transient condition, and wherein the Hidden Markov Model includes a plurality of states, each of the plurality of states corresponding to a sample in the turbine sensor data taken at a corresponding time during the transient condition.

12. The apparatus of claim 11 wherein the Hidden Markov Model detector comprises a left-right Hidden Markov Model.

13. The apparatus of claim 11 wherein the plurality of states is equal in number to a number of samples in the turbine sensor data during the transient condition.

14. The apparatus of claim 11 wherein the Hidden Markov Model is trained using a test data set, and wherein the test data set includes data from a normal transient condition, such that the Hidden Markov Model detector compares the turbine sensor data to the normal transient condition represented by the test data set.

15. The apparatus of claim 11 wherein the Hidden Markov Model is trained using a test data set, and wherein the test data set includes data from an abnormal transient condition, such that the Hidden Markov Model detector compares the turbine sensor data to the abnormal transient condition represented by the test data set.

16. The apparatus of claim 11 wherein the sensor data comprises engine speed.

17. The apparatus of claim 11 wherein the sensor data comprises exhaust gas temperature.

18. The apparatus of claim 11 wherein the transient condition comprises turbine engine startup.

19. The apparatus of claim 11 wherein the transient condition comprises a change in engine power setting or engine operating mode.

20. The apparatus of claim 11 wherein each of the plurality of states includes a model output, and wherein the number of states and the number of model outputs is equal in number to a number of samples in the turbine sensor data during the transient condition, and wherein the turbine sensor data includes both engine speed data and exhaust gas temperature data, and wherein the Hidden Markov Model detector compares the turbine sensor data from the transient condition to a sample transient condition represented by a test data set used to train the Hidden Markov Model detector.

21. A program product comprising:
 a) a transient fault detection program, the transient fault detection program including:
  a Hidden Markov Model detector, the Hidden Markov Model receiving turbine sensor data from the turbine engine during a transient condition and analyzing the sensor data to determine a likelihood that a fault occurred during the transient condition, and wherein the Hidden Markov Model includes a plurality of states, each of the plurality of states corresponding to a sample in the turbine sensor data taken at a corresponding time during the transient condition; and
 b) computer-readable signal bearing media bearing said program.

22. The program product of claim 21 wherein the computer-readable signal bearing media comprises recordable media.

23. The program product of claim 21 wherein the computer-readable signal bearing media comprises transmission media.

24. The program product of claim 21 wherein the Hidden Markov Model detector comprises a left-right Hidden Markov Model.

25. The program product of claim 21 wherein the plurality of states is equal in number to a number of samples in the turbine sensor data during the transient condition.

26. The program product of claim 21 wherein the Hidden Markov Model is trained using a test data set, and wherein the test data set includes data from a normal transient condition, such that the Hidden Markov Model detector compares the turbine sensor data to the normal transient condition represented by the test data set.

27. The program product of claim 21 wherein the Hidden Markov Model is trained using a test data set, and wherein the test data set includes data from an abnormal transient condition, such that the Hidden Markov Model detector compares the turbine sensor data to the abnormal transient condition represented by the test data set.

28. The program product of claim 21 wherein the sensor data comprises engine speed.

29. The program product of claim 21 wherein the sensor data comprises exhaust gas temperature.

30. The program product of claim 21 wherein the transient condition comprises turbine engine startup.

31. The program product of claim 21 wherein the transient condition comprises a change in engine power setting or engine operating mode.

32. The program product of claim 21 wherein each of the plurality of states includes a model output, and wherein the number of states and the number of model outputs is equal in number to a number of samples in the turbine sensor data during the transient condition, and wherein the turbine sensor data includes both engine speed data and exhaust gas temperature data, and wherein the Hidden Markov Model detector compares the turbine sensor data from the transient condition to a sample transient condition represented by a test data set used to train the Hidden Markov Model detector.

33. A method of detecting faults in transient conditions in a turbine engine, the method comprising the steps of:
 a) receiving turbine sensor data from the turbine engine during a transient condition;
 b) analyzing the sensor data with a Hidden Markov Model detector to determine a likelihood that a fault occurred during the transient condition, and wherein the Hidden Markov Model detector includes plurality of states, each of the plurality of states corresponding to a sample in the turbine sensor data taken at a corresponding time during the transient condition.

34. The method of claim 33 wherein the Hidden Markov Model detector comprises a left-right Hidden Markov Model.

35. The method of claim 33 wherein the plurality of states is equal in number to a number of samples in the turbine sensor data during the transient condition.

36. The method of claim 33 further comprising the step of training the Hidden Markov Model using a test data set, and wherein the test data set includes data from a normal transient condition, such that the Hidden Markov Model detector compares the turbine sensor data to the normal transient condition represented by the test data set.

37. The method of claim 33 further comprising the step of training the Hidden Markov Model using a test data set, and wherein the test data set includes data from an abnormal transient condition, such that the Hidden Markov Model detector compares the turbine sensor data to the abnormal transient condition represented by the test data set.

38. The method of claim 33 wherein the sensor data comprises engine speed.

39. The method of claim 33 wherein the sensor data comprises exhaust gas temperature.

40. The method of claim 33 wherein the transient condition comprises turbine engine startup.

41. The method of claim 33 wherein the transient condition comprises a change in engine power setting or engine operating mode.

42. The method of claim 33 wherein each of the plurality of states includes a model output, and wherein the number of states and the number of model outputs is equal in number to a number of samples in the turbine sensor data during the transient condition, and wherein the turbine sensor data includes both engine speed data and exhaust gas temperature data, and wherein the Hidden Markov Model detector compares the turbine sensor data from the transient condition to a sample transient condition represented by a test data set used to train the Hidden Markov Model detector.

* * * * *